Dec. 17, 1968   S. A. LUBMAN ET AL   3,416,375
ADJUSTABLE MEASURING DEVICE
Filed Oct. 4, 1967
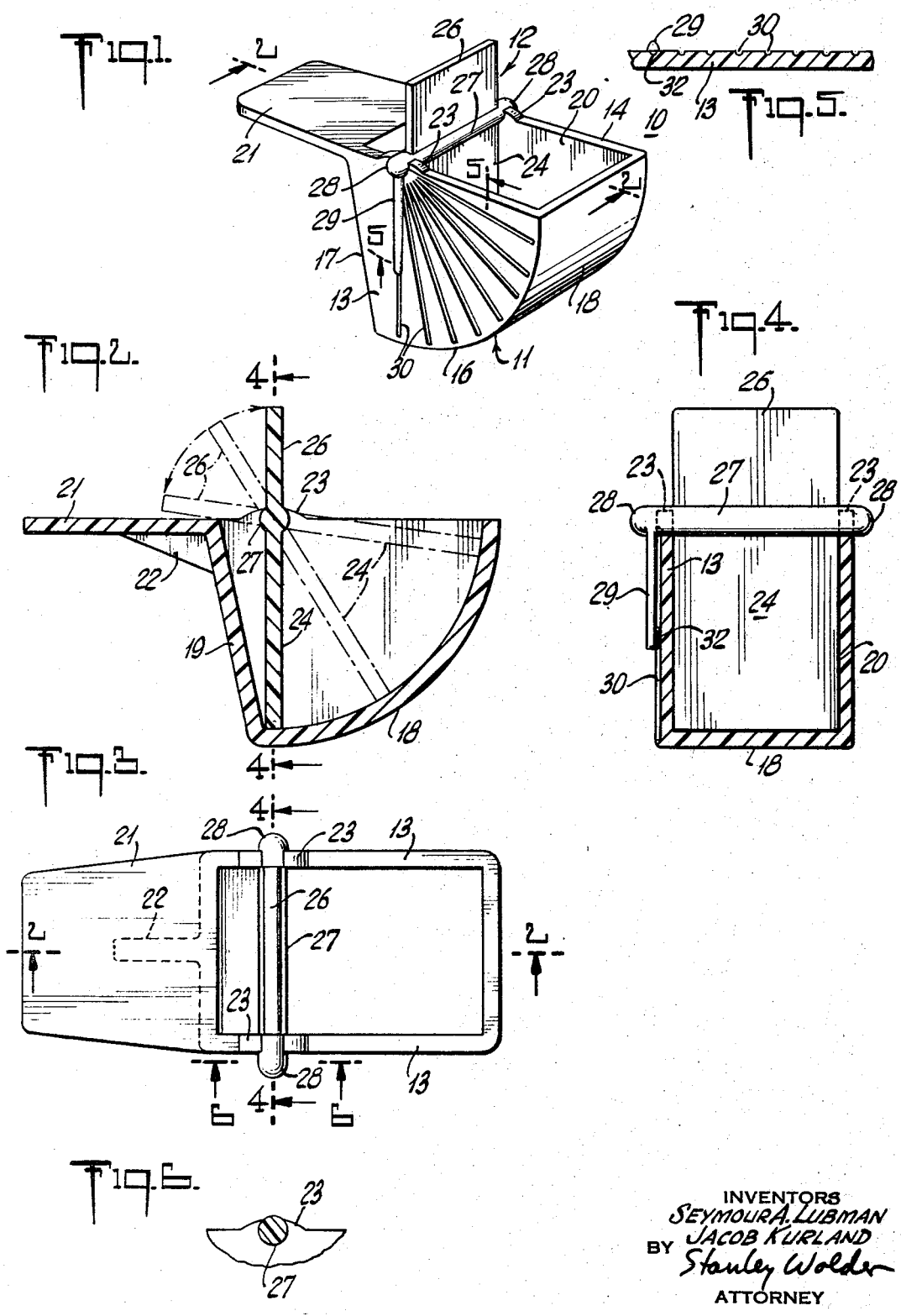
INVENTORS
SEYMOUR A. LUBMAN
JACOB KURLAND
BY Stanley Wolder
ATTORNEY

United States Patent Office

3,416,375
Patented Dec. 17, 1968

3,416,375
ADJUSTABLE MEASURING DEVICE
Seymour A. Lubman, Livingston, and Jacob Kurland, Leonia, N.J., assignors to The Purdue Frederick Company, Yonkers, N.Y., a corporation of New York
Continuation-in-part of application Ser. No. 416,721, Dec. 8, 1964. This application Oct. 4, 1967, Ser. No. 672,925
4 Claims. (Cl. 73—429)

ABSTRACT OF THE DISCLOSURE

A measuring cup includes parallel sector shaped side walls and a cylindrical bottom and end wall. A panel is swingably supported between the end walls with its edges proximate the cup side and cylindrical walls. Indexing grooves are formed in a side wall outer face radiating from the panel swing axis and an arm coplanar and integrally formed with the panel is positioned along the outer face of a side wall and is provided with a detent resiliently urged into releasable engagement with a selected groove.

Cross-reference

The present invention is a continuation-in-part of the copending application of Seymour A. Lubman et al., Ser. No. 416,721, filed Dec. 8, 1964.

Background of the invention

The present invention relates generally to improvements in measuring devices and it relates more particularly to an improved adjustable capacity measuring cup or spoon.

In the administration and use of many particulate materials such as therapeutic compositions, dietary supplements, various food preparations and materials and the like, it is frequently desirable to dispense these materials in predetermined amounts or doses which may vary from individual to individual and from time to time. While it is common to measure the quantity to be dispensed by means of a fixed capacity measuring spoon, where the amount to be dispensed exceeds or is less than the capacity of the measuring spoon more than one spoonful or a fraction of a spoonful must be measured and the accuracy of such measurement depends on the judgment of the individual and is often unreliable with the result that the quantity of the dispensed material may differ appreciably from that desired. Many forms of adjustable capacity dispensing cups and spoons have been proposed but these possess numerous drawbacks and disadvantages. They are awkward and unreliable devices, unattractive, expensive and otherwise leave much to be desired.

Summary of the invention

It is therefore a principal object of the present invention to provide an improved measuring device.

Another object of the present invention is to provide an improved variable capacity measuring device.

Still another object of the present invention is to provide an improved adjustable capacity measuring spoon having indicating means designating the adjusted capacity thereof.

A further object of the present invention is to provide an improved measuring device of the above nature characterized by its versatility, reliability, accuracy, ease of use, low cost and attractive appearance.

The above and other objects of the present invention will become apparent from a reading of the following description taken in conjunction with the accompanying drawing.

In a sense the present invention contemplates the provision of a measuring device comprising a first member including a pair of transversely spaced side walls having confronting inner faces and a parallel arcuate end edge and an arcuate end wall extending along and between said arcuate edges, said side walls being provided with journal sockets concentric with said end walls and adjacent to the upper edges thereof, and a swingable panel disposed between said side walls and having side and end edges complementing and in substantial sliding engagement with the side wall and arcuate end wall inner faces and provided with aligned opposite transversely projecting pivot elements engaging respective of said sockets, and a finger piece projecting longitudinally from said panel above said sockets, one of said side walls having formed on the outer face thereof a plurality of circumferentially spaced first indexing means, and an indexing arm projecting radially from one of said pivot elements along said side wall outer face and provided with a second indexing means adapted to releasably engage selected of said first indexing means.

According to a preferred form of the present device the body member is a unitary integral open topped receptacle advantageously formed of a synthetic organic polymer and including transversely spaced vertical parallel substantially flat sector shaped side walls, an arcuate cylindrical first end and bottom wall and a second end wall extending upwardly from the bottom edge of the first end wall. Journal sockets are disposed along the upper edges of the side walls and have restricted top openings therein, and a handle member extends longitudinally from the upper edge of the second end wall. The swingable panel is likewise preferably formed of synthetic organic polymer and is of rectangular shape provided with transversely aligned pivot elements registering with the journal sockets, the panel extending above the pivot elements to define a finger piece. The first indexing means is defined by a plurality of grooves formed in the side wall outer face extending radially from the socket and the indexing arm is resilient and inwardly urged and is provided with an inwardly directed detent which defines the second indexing means which releasably engages a selected indexing groove. Indicia are provided designating the measuring device capacity corresponding to each of the indexing grooves. The measuring device of the present invention is not only accurate and easy to use but is very attractive and inexpensive and suitable as a give-away item or a throw-away item which may be packaged with the material to be measured and dispensed.

Brief description of the drawing

FIGURE 1 is an enlarged front perspective view of a measuring spoon embodying the present invention illustrated in a maximum capacity condition;

FIGURE 2 is a sectional view taken along line 2—2 in FIGURES 1 and 3, the adjustment member being illustrated by broken line in an intermediate and a low capacity position;

FIGURE 3 is a top plan view thereof;

FIGURE 4 is a sectional view taken along line 4—4 in FIGURE 3;

FIGURE 5 is a fragmentary sectional view taken along line 5—5 in FIGURE 1; and

FIGURE 6 is a sectional view taken along line 6—6 in FIGURE 3.

Description of the preferred embodiment

Referring now to the drawing which illustrates a preferred embodiment of the present invention the reference numeral 10 generally designates the improved measuring device which is in the form of a spoon or cup and comprises an assembly of two unitary integrally formed members, a receptacle member 11 and a capacity adjusting swingable panel member 12. The receptacle and panel members 11 and 12 are advantageously formed of a synthetic organic polymer, for example polyethylene or polypropylene, preferably of the high density type, polystyrene, or the like. The polyolefins are advantageously employed since they are of very low cost, easily formed, strong and of high impact strength. The members 11 and 12 may be inexpensively injection molded and assembled to produce the measuring device 10.

The receptacle member 11 includes a pair of transversely spaced opposite parallel vertical side walls 13 of substantially sector shape including upper horizontal edges 14, arcuate front and bottom edges 16 extending about 90° between the ends thereof and upwardly outwardly inclined linear end edges 17. An arcuate cylindrical front and bottom wall 18 extends along and between the arcuate edges 18 and is coextensive therewith and a flat rear wall 19 extends between and along the rear edges 17 and is coextensive therewith. The walls 13, 18 and 19 delineate an open topped cavity 20.

A handle member 21 in the form of a flat horizontal plate having rearwardly converging side edges is formed integral with and projects rearwardly from the upper border of the end wall 17. A medially disposed gusset member 22 is joined to the inner dihedral faces of and integrally formed with the wall 19 and handle 22 at the junction thereof to reinforce the handle 21 and its connection to the wall 19. A pair of opposite protuberances or raised sections 23 is formed along the side wall upper edges 14 forwardly of the upper edge of the wall 19 and in vertical alignment with the bottom edge thereof. Transversely axially aligned journal openings or sockets are formed in the sections 23 and have radially extending upper apertures formed therein defining restricted entrant throats, the axis of the journal sockets being concentric with the arcuate cylindrical wall 18.

The panel member 12 lies in a transverse plane and is of rectangular flat configuration including a lower section 24 disposed in the cavity 20 and an upper finger piece defining section 26 projecting above the cavity 20. A transversely extending shaft defining cylindrical section 27 is integrally formed with the panel 12 between the upper and lower sections 26 and 24 and terminates in outwardly directed pivot elements 28 which rotatably register with the journal sockets. The side edges of the panel section 24 extend along and are substantially in sliding engagement with the inner faces of the side walls 13 and the bottom edge thereof extends along and is substantially in sliding engagement with the inner face of the arcuate wall 18.

An elongated pointer member or indexing arm 29 is integrally formed with and projects radially from the outer end of the pivot elements 28 and extends along an outer face of a corresponding side wall 13 and terminates short of the bottom edge 16 thereof. The indexing arm 29 is substantially coplanar with the panel lower section 24 and the wall 13 is substantially sandwiched between the arm 29 and the corresponding edge of the panel section 24. Indicia defining indexing means in the form of regularly angularly spaced linear grooves 30 radiating from the journal socket aixs are suitably formed in the outer face of the side wall 13 along which the indexing arm 29 extends and are preferably of arcuate cross-section. A scale may be provided in association with the grooves 30 to designate the capacity of the cavity delineated by the panel lower section 24, side walls 13 and arcuate wall 18 with the panel 12 in an angular position corresponding to that of the arm 29. The arm 29 terminates in an inwardly directed detent or boss 32 which substantially mates the cross-section of the grooves 30, and when in registry with a groove is urged by the arm 29 into releasable engagement therewith.

The body member 11 and the panel member 12 are simply assembled by inserting the panel lower section 24 into the cavity 20 and snapping the pivot elements 28 into the journal sockets by way of the restricted radial throats therein. In employing the measuring device 10 the panel 12 is swung by means of the finger piece 26 to an angle corresponding to a desired capacity of the cavity 20 as designated by the pointer or indexing arm 29 and a registering indexing groove 30, the detent 32 releasably engaging the groove. The measuring device is held by the handle 21 and is filled to the level of the edge 14 with the particulate material to be measured and dispensed in the usual manner.

While there has been described and illustrated a preferred embodiment of the present invention it is apparent that numerous alterations, omissions and additions may be made without departing from the spirit thereof.

What is claimed is:

1. A measuring device comprising a unitary open topped receptacle member including side walls and an arcuate first end wall, said side walls being provided with journal sockets adjacent their upper edges and concentric with said arcuate end wall and adjacent to the upper edges thereof, and a swingable panel disposed between said side walls and having side and end edges complementing and in substantially sliding engagement with said side wall and arcuate end wall inner faces and provided with aligned opposite transversely projecting pivot elements engaging respective of said sockets, a finger piece projecting longitudinally from said panel above said sockets, one of said side walls having formed on the outer face thereof a plurality of circumferentially spaced grooves radiating from a respective socket and an indexing arm substantially coplanar with said panel projecting radially from one of said pivot elements along said side wall outer face and provided with a detent directed inwardly from said indexing arm and resiliently urged thereby into releasable engagement with a selected groove.

2. The measuring device of claim 1 wherein said finger piece is coplanar with said panel.

3. The measuring device of claim 1 wherein said receptacle includes an integrally formed second end wall opposite said arcuate end wall and a handle integrally formed with and projecting longitudinally from said second end wall.

4. The measuring device of claim 1 wherein said journal sockets have radial openings formed therein of lesser width than the diameters of said sockets.

References Cited

UNITED STATES PATENTS

| 2,165,642 | 7/1939 | Mayer | 73—429 |
| 2,313,213 | 3/1943 | Atherley | 73—429 X |
| 2,551,002 | 5/1951 | Jennings | 73—429 |

S. CLEMENT SWISHER, *Primary Examiner.*

DANIEL M. YASICH, *Assistant Examiner.*

U.S. Cl. X.R.

222—154